(12) United States Patent
Chuang et al.

(10) Patent No.: US 10,638,152 B2
(45) Date of Patent: Apr. 28, 2020

(54) METHOD AND APPARATUS OF VIDEO CODING WITH AFFINE MOTION COMPENSATION

(71) Applicant: MEDIATEK INC., Hsin-Chu (TW)

(72) Inventors: Tzu-Der Chuang, Zhubei (TW); Ching-Yeh Chen, Taipei (TW); Han Huang, Beijing (CN); Xiaozhong Xu, State College, PA (US); Shan Liu, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/083,662

(22) PCT Filed: Mar. 13, 2017

(86) PCT No.: PCT/CN2017/076420
§ 371 (c)(1),
(2) Date: Sep. 10, 2018

(87) PCT Pub. No.: WO2017/157259
PCT Pub. Date: Sep. 21, 2017

(65) Prior Publication Data
US 2019/0082191 A1 Mar. 14, 2019

Related U.S. Application Data

(60) Provisional application No. 62/437,757, filed on Dec. 22, 2016.

(30) Foreign Application Priority Data

Mar. 15, 2016 (WO) ................ PCT/CN2016/076360

(51) Int. Cl.
*H04N 19/513* (2014.01)
*H04N 19/423* (2014.01)
(Continued)

(52) U.S. Cl.
CPC ......... *H04N 19/513* (2014.11); *H04N 19/119* (2014.11); *H04N 19/176* (2014.11);
(Continued)

(58) Field of Classification Search
CPC .. H04N 19/513; H04N 19/537; H04N 19/423; H04N 19/119; H04N 19/58; H04N 19/176; H04N 19/52; H04N 19/105
See application file for complete search history.

(56) References Cited

U.S. PATENT DOCUMENTS

2003/0174776 A1* 9/2003 Shimizu ................ H04N 19/52
375/240.16
2010/0246675 A1 9/2010 Mohammad et al.
(Continued)

FOREIGN PATENT DOCUMENTS

CN 101854545 A 10/2010
CN 104363451 A 2/2015
(Continued)

OTHER PUBLICATIONS

International Search Report dated Dec. 14, 2016, issued in application No. PCT/CN2016/076360.
(Continued)

*Primary Examiner* — Tracy Y. Li
(74) *Attorney, Agent, or Firm* — McClure, Qualey & Rodack, LLP

(57) ABSTRACT

A method and apparatus for video encoding and decoding with affine motion compensation are disclosed. An embodiment of the method receives input data associated with a current block coded or to be coded in an affine mode. Two or more motion vectors of a neighboring block are retrieved from a buffer, where at least one of the retrieved motion vectors is not corresponding to a sub-block in a first neighboring block row or a first neighboring block column. The
(Continued)

method derives an affine candidate including affine motion vectors using the retrieved two or more motion vectors, and encodes or decodes the current block by predicting the current block using one or more motion compensated blocks by the derived affine candidate. The buffer for affine candidate derivation stores selective motion vectors less than all motion vectors of coded blocks in the current picture.

5 Claims, 9 Drawing Sheets

(51) Int. Cl.
  *H04N 19/52*   (2014.01)
  *H04N 19/537*   (2014.01)
  *H04N 19/119*   (2014.01)
  *H04N 19/176*   (2014.01)
  *H04N 19/58*   (2014.01)
  *H04N 19/105*   (2014.01)

(52) U.S. Cl.
  CPC ........... *H04N 19/423* (2014.11); *H04N 19/52* (2014.11); *H04N 19/537* (2014.11); *H04N 19/58* (2014.11); *H04N 19/105* (2014.11)

(56) References Cited

U.S. PATENT DOCUMENTS

| | | |
|---|---|---|
| 2010/0246680 A1 | 9/2010 | Tian et al. |
| 2010/0329347 A1 | 12/2010 | Kim et al. |
| 2013/0028328 A1* | 1/2013 | Shiodera .............. H04N 19/105 375/240.16 |
| 2014/0341290 A1 | 11/2014 | Merkle et al. |
| 2018/0220149 A1* | 8/2018 | Son ...................... H04N 19/105 |

FOREIGN PATENT DOCUMENTS

| | | |
|---|---|---|
| CN | 104539966 A | 4/2015 |
| CN | 105163116 A | 12/2015 |
| EP | 3 177 015 A1 | 6/2017 |
| EP | 3 197 165 A1 | 7/2017 |
| EP | 3 331 242 A1 | 6/2018 |
| JP | 2015-056043 A | 3/2015 |

OTHER PUBLICATIONS

International Search Report dated Apr. 28, 2017, issued in application No. PCT/CN2017/076420.
Huang, H., et al.; "Affine skip and direct modes for efficient video coding;" Nov. 2012; pp. 1-6.
Zou, R., et al.; "An adaption motion data storage reduction method for temporal prediction;" Nov. 2011; pp. 48-59.
"Affine transform prediction for next generation video coding;" Telecommunication Standardization Sector; Sep. 2015; pp. 1-11.
Chen, H., et al.; "Affine skip and merge modes for video coding;" Oct. 2015; pp. 1-5.

\* cited by examiner

METHOD AND APPARATUS OF VIDEO CODING WITH AFFINE MOTION COMPENSATION

CROSS REFERENCE TO RELATED APPLICATIONS

The present invention claims priority to PCT Patent Application, Serial No. PCT/CN2016/076360, filed on Mar. 15, 2016, entitled "Affine Prediction for Video Coding" and U.S. Provisional Patent Application Ser. No. 62/437,757, filed on Dec. 22, 2016, entitled "Affine Prediction Buffer Management for Video Coding". The PCT Patent Application and the U.S. Provisional Patent Application are hereby incorporated by reference in their entireties.

FIELD OF THE INVENTION

The present invention relates to video coding with affine motion compensation. In particular, the present invention relates to buffer management for a video coding system implementing affine motion compensation and techniques to enable adaptive motion vector resolution for affine motion compensation.

BACKGROUND AND RELATED ART

Video data requires a large storage space to buffer intermediate data during encoding and decoding. Along with the growing high resolution and higher frame rates, as well as more powerful coding techniques are developed to achieve better coding performance, the storage requirement for video encoder and decoder increase significantly. One of the newly developed coding techniques is affine motion prediction and compensation, which effectively tracks more complicated motion such as rotation, zooming, and the deformation of moving objects. Inter frame motion prediction methods applied in the recently developed coding standards such as High Efficiency Video Coding (HEVC) only consider two-dimensional (2D) translational motion, where all the pixels in an area of interest follow the same motion direction and magnitude. Affine motion prediction is capable of describing 2D block rotations and scaling according to a four-parameter affine model. Affine motion prediction is also capable of capturing 2D deformations according to a six-parameter affine model which transforms a square or a rectangle into a parallelogram. There are two major modes for affine motion prediction proposed in the literatures, including affine Merge mode and affine Inter mode. Affine Merge mode allows the inheritance of affine motion information from a spatially neighboring block whereas affine Inter mode constructs several most probable candidates by combining motion information of spatially neighboring blocks. Affine Inter mode is also referred to affine advance motion vector prediction (AMVP) mode.

Motion occurs across pictures along temporal axis can be described by a four-parameter affine motion model as shown in Equation (1). Assuming A(x, y) is an original pixel at location (x, y) under consideration, and A'(x', y') is a corresponding reference pixel at location (x', y') in a reference picture for the original pixel A(x, y).

$$x'=a0*x+a1*y+a2, \text{ and}$$

$$y'=-a1*x+a0*y+a3. \quad (1)$$

where a0, a1, a2 and a3 are the four parameters in the four-parameter affine motion model.

The motion vector ($v_x$, $v_y$) between this original pixel A(x,y) and its corresponding reference pixel A'(x',y') in a block coded in an affine mode is described as:

$$v_x=(1-a0)*x-a1*y-a2, \text{ and}$$

$$v_y=(1-a0)*y+a1*x-a3. \quad (2)$$

An exemplary four-parameter affine motion model is shown in FIG. 1A. Two corner pixels 110 and 112 are located at upper-left and upper-right corners of a current block 102, and these two corner pixels are also called control points for the current block 102 in the four-parameter affine motion model. Motion vectors Mv0 and Mv1 of the two control points 110 and 112 map the current block 102 to a reference block 104 in a reference picture. The motion vector field of each pixel A(x,y) in the current block 102 may be derived based on the motion vectors Mv0 and Mv1 of the control points 110 and 112 according to Equation (3).

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (3)$$

where ($v_{0x}$, $v_{0y}$) represents the motion vector Mv0 at the upper-left corner 110, ($v_{1x}$, $v_{1y}$) represents the motion vector Mv1 at the upper-right corner 112, and w represents a width of the current block. For block-based affine motion compensation, when the motion vectors Mv0 and Mv1 of the two control points are decoded, the motion vector of each 4×4 block of the current block 102 can be determined according to Equation (3). In other words, the four-parameter affine motion model for the current block 102 can be specified by the two motion vectors Mv0 and Mv1 at the two control points. Furthermore, while the upper-left corner and the upper-right corner of the block are used as the two control points, other two control points may also be used.

A six-parameter affine motion model can be described by Equation (4). In this model, a total of six parameters a0, a1, a2, b0, b1 and b2 and three control points are used. For each pixel A(x, y), the motion vector ($v_x$, $v_y$) between this pixel A(x, y) and its corresponding reference pixel A'(x', y') is shown in Equation (5).

$$x'=a0+a1*x+a2*y, \text{ and}$$

$$y'=b0+b1*x+b2*y. \quad (4)$$

$$v_x=(a1-1)*x+a2*y+a0, \text{ and}$$

$$v_y=(b2-1)*y+b1*x+b0. \quad (5)$$

The motion vector for each pixel predicted by the six-parameter affine motion model is also location dependent. FIG. 1B illustrates an example of affine motion compensation according to the six-parameter affine motion model, where a current block 122 is mapped to a reference block 124 in a reference picture. The correspondences between three corner pixels 130, 132, and 134 of the current block 122 and three corner pixels of the reference block 124 can be determined by the three arrows as shown in FIG. 1B. The six parameters for the affine motion model can be derived based on three known motion vectors Mv0, Mv1, Mv2 of the upper-left, upper-right, and lower-left control points of the current block 122. Parameter derivation for the affine motion model is known in the field and the details are omitted here.

Various implementations of affine Inter mode and affine Merge mode have been discussed, for example, an affine flag is used to indicate whether the affine Inter mode is applied, and this affine flag is signaled for each Inter-coded coding unit (CU) when the CU is equal to or larger than 16×16. A candidate motion vector predictor (MVP) pair list is constructed for a current CU using valid neighboring coded blocks if the current CU is coded or to be coded in affine Inter mode. FIG. 2 illustrates an example of the candidate MVP pair derivation for a current block 20 coded in affine Inter mode or affine Merge mode. As shown in FIG. 2, a motion vector predictor (MVP) for the motion vector Mv0 at an upper-left control point of the current block 20 is selected from motion vectors of upper-left neighboring coded blocks A0, A1, or A2; and a MVP for Mv1 at an upper-right control point of the current block 20 is selected from motion vectors of upper-right neighboring coded blocks B0 and B1. An MVP index for the candidate MVP pair list is signaled in a video bitstream and motion vector differences (MVDs) of the two control points are coded in the video bitstream.

For a current block 20 coded in Merge mode, five neighboring coded sub-blocks C0 (referred as the left-bottom block), B0 (referred as the top-right block), B (referred as the upper-right corner block), C1 (referred as the lower-left corner block), and A0 (referred as the upper-left corner block) in FIG. 2 are sequentially checked to determines whether any of the neighboring coded sub-blocks is coded in affine Inter mode or affine Merge mode. The current block 20 in this example is a prediction unit (PU). An affine flag is signaled to indicate whether the current block 20 is coded in affine Merge mode only if any of the neighboring coded sub-blocks is coded in affine Inter mode or affine Merge mode. When encoding or decoding the current block 20 according to affine Merge mode, a first available affine-coded neighboring block is determined by selecting from the five neighboring coded sub-blocks. The first available affine-coded neighboring block including the selected neighboring coded sub-block is used to derive an affine Merge candidate. The affine Merge candidate is used for deriving a predictor in a reference picture for the current block. The selection order for selecting one of the neighboring coded sub-blocks is from left-bottom block, top-right block, upper-right corner block, lower-left corner block to upper-left corner block (C0→B→B1→C1→A0) as shown in FIG. 2. The affine Merge candidate for the current block 20 is derived from MVs at the control points of the first available affine-coded neighboring block, for example, the MVs of a top-left N×N sub-block and a top-right N×N sub-block of the first available affine-coded neighboring block are used to derive the affine Merge candidate if a four-parameter affine motion model is applied. The MV of a bottom-left N×N sub-block of the first available affine-coded neighboring block is also used to derive the affine Merge candidate when a third control point is included for a six-parameter affine motion model.

BRIEF SUMMARY OF THE INVENTION

A method and apparatus for video encoding and decoding with affine motion compensation in a video coding system are disclosed. Embodiments of a video encoder according to the present invention receive input data associated with a current block in a current picture and embodiments of a video decoder according to the present invention receive a video bitstream corresponding to compressed data including the current block in the current picture. The current block is coded or to be coded in an affine mode according to an affine motion model. Various embodiments of the present invention reduce the buffer requirement of a temporal buffer for affine candidate derivation. The temporal buffer stores selective motion vectors less than all motion vectors of previous coded blocks in the current picture. Embodiments of the method retrieve two or more motion vectors (MVs) of a neighboring block from the temporal buffer, where at least one of the retrieved motion vectors is not corresponding to a sub-block in a first neighboring N×N block row closest to a top boundary of the current block or a first neighboring N×N block column closest to a left boundary of the current block, and N×N is a block size for storing one motion vector in the temporal buffer. The method further derives an affine candidate including affine motion vectors using the retrieved two or more motion vectors of the neighboring block, and encodes or decodes the current block by predicting the current block using one or more motion compensated blocks derived by the derived affine candidate. Each of the affine motion vectors predicts a movement between a point of the current block and a corresponding point of one or more motion compensated blocks.

In some embodiments, the temporal buffer stores MVs of the first neighboring N×N block row and a second neighboring N×N block row that are closest to the top boundary of the current block, and the temporal buffer stores MVs of the first neighboring N×N block column and a second neighboring N×N block column that are closest to the left boundary of the current block.

In one embodiment, the retrieved MVs includes first and second MVs for a four-parameter affine motion model, for example, the first and second MVs are replacing MVs replacing original MVs at an upper-left corner and an upper-right corner of the neighboring block respectively if the neighboring block is above or adjacent to an upper-left corner of the current block. The first MV is a replacing MV replacing an original MV at an upper-left corner of the neighboring block and the second MV is an original MV at an upper-right corner of the neighboring block if the neighboring block is on the left side of the current block. In an embodiment, the first and second MVs correspond to first and second sub-blocks in the neighboring block, and a first affine MV of the affine MVs is derived using the first and second MVs, a pixel position of the current block relative to the current picture, a pixel position of the first sub-block relative to the current picture, and a width of the neighboring block. A second affine MV of the affine MVs is derived using the first and second MVs, the width of the neighboring block, and a width of the current block.

In another embodiment, the retrieved MVs includes first, second and third MVs for a six-parameter affine motion model, for example, the three MVs are for first, second and third sub-blocks in the neighboring block, and a first affine MV is derived using at least two of the three MVs, a pixel position of the current block relative to the current picture, a pixel position of the first sub-block relative to the current picture, and a width of the neighboring block. A second affine MV is derived using the first and second motion vectors, the width of the neighboring block, and a width of the current block, and a third affine MV is derived using the first and third motion vectors and at least one of a height of the neighboring block and a height of the current block. In this embodiment, the first, second MVs are replacing MVs replacing original MVs at an upper-left corner and an upper-right corner of the neighboring block, and the third MV is an original MV at a lower-left corner of the neighboring block if the neighboring block is above the current block. The first, second, and third MVs are replacing MVs replacing original MVs at an upper-left corner, upper-right corner, and lower left corner of the neighboring block if the neighboring block is adjacent to an upper-left corner of the current block. The first and third MVs are replacing MVs replacing original MVs at an upper-left corner and lower-left corner of the neighboring block, and the second MV is an original MV at an upper-right corner of the neighboring block if the neighboring block is on the left side of the current block.

The current block is predicted by the motion compensated blocks by the affine motion vectors in the affine candidate according to a four-parameter affine motion model with two control points or according to a six-parameter affine motion model with three control points. The temporal buffer stores the selective motion vectors, for example, the temporal buffer stores MVs of M N×N block rows above the current block, and M is less than a largest coding unit height divided by N (CTU_height/N). In another embodiment, the temporal buffer stores MVs of K N×N block columns on a left side of the current block, and K is less than a largest coding unit width divided by N (CTU_width/N).

In some embodiments of the method, the retrieved MVs are original MVs at two or more control points of the neighboring block. The control points include at least two of an upper-left corner, an upper-right corner, a bottom-right corner, and a bottom-left corner of the neighboring block. In an embodiment, the temporal buffer stores MVs of 2 N×N block rows and 2 N×N block columns, including original MVs of a first neighboring N×N block row, a first neighboring N×N block column, a top N×N block row set and a left-most N×N block column set. The first neighboring N×N block row is a last row in upper neighboring blocks that is closest to the top boundary of the current block, the first neighboring N×N block column is a last column in left neighboring blocks that is closest to the left boundary of the current block, the top N×N block row set is the first rows in the upper neighboring blocks, and the left-most N×N block column set is the first columns in the left neighboring blocks.

In yet another embodiment, the method comprises receiving input data associated with a current block coded or to be coded in an affine mode, calculating and storing affine parameters for a plurality of coded blocks in the current picture, retrieving the affine parameter of one or more coded block from the temporal buffer corresponding to a neighboring block of the current block to derive an affine candidate including affine MVs. The current block is encoded or decoded by predicting the current block using one or more motion compensated blocks by the derived affine candidate. Each of the affine motion vectors predicts a movement between a point of the current block and a corresponding point of the one or more motion compensated blocks.

The affine parameters in an embodiment include a horizontal direction motion vector (MV) offset and one motion vector in the neighboring block when the affine motion model is a four-parameter affine motion model using two of an upper-left corner, an upper-right corner, an lower-left corner, and a lower-right corner as the control points, or the affine parameters include a vertical direction motion vector (MV) offset and one motion vector in the neighboring block when the affine motion model is a four-parameter affine motion model using two of an upper-left corner, an upper-right corner, a lower-left corner, and a lower-right corner as control points. The affine parameters in another embodiment include a horizontal direction MV offset, a vertical direction MV offset, and a motion vector in the neighboring block when the affine motion model is a six-parameter affine motion model. An example of the motion vector in the neighboring block is a motion vector at an upper-left corner, upper-right corner, lower-right corner, or lower-left corner of the neighboring block. The affine parameters in another embodiment include a scaled MV offset for the coded block. The affine parameters in yet another embodiment include two or three affine motion vectors representing motion vectors at two or three control points, and the temporal buffer stores the two or three affine motion vectors for the coded block.

Another embodiment of the method comprises receive input data associated with a current block coded or to be coded in an affine mode, retrieving two or more MVs of a valid neighboring block from a temporal buffer for the current block, deriving an affine candidate including affine MVs using the retrieved two or more MVs of the valid neighboring block, and encoding or decoding the current block by predicting the current block using one or more compensated blocks by the derived affine candidate. The valid neighboring block does not include a neighboring block adjacent to an upper-left corner of the current block. The temporal buffer stores MVs of one neighboring N×N block row and one neighboring N×N block column of the current block, where N×N is a block size for storing one MV in the temporal buffer. The affine MVs predict a movement between a point of the current block and a corresponding point of the one or more motion compensated blocks.

Aspects of the disclosure further provide an apparatus comprising one or more electronic circuits configured for performing the video coding methods with affine motion compensation. Other aspects and features of the invention will become apparent to those with ordinary skill in the art upon review of the following descriptions of specific embodiments.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

A decoder complied with the HEVC standard down-samples the decoded motion vectors of each PU coded by inter prediction including AMVP mode and Merge mode with a 16:1 ratio, and the decoder stores the down-sampled motion vectors in a buffer for MVP derivation for following blocks in a current picture and following pictures. A motion vector of the top-left 4×4 block in every 16×16 block is stored in the buffer and the stored motion vector represents the motion vector of the entire 16×16 block. The motion vector precision may be 1/64 pixel precision and a predictor is generated by applying a high accuracy Discrete Cosine Transform Interpolation Filter (DCTIF). The high accuracy motion vector field is then clipped to 1/8 pixel precision before storing to the buffer.

Figure 1A:
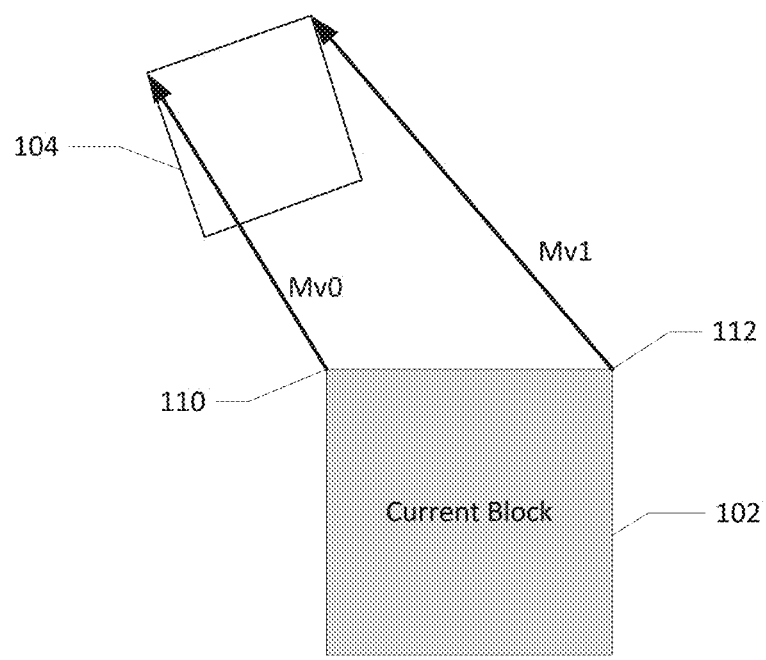
FIG. 1A illustrates four-parameter affine prediction mapping a current block to one or more compensated blocks according to two control points.
Figure 1B:
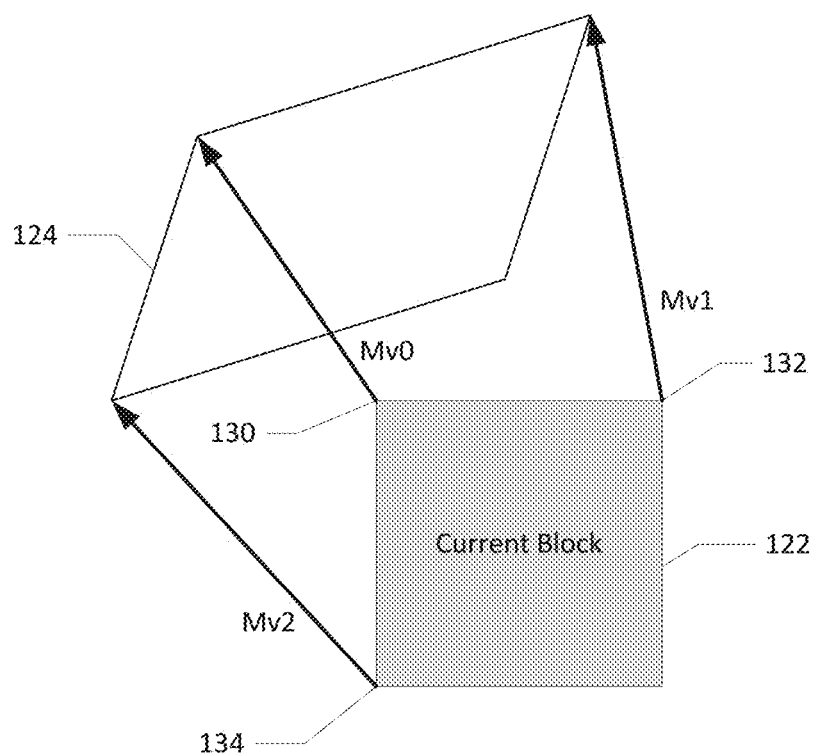
FIG. 1B illustrates six-parameter affine prediction mapping a current block to one or more compensated blocks according to three control points.
Figure 2:
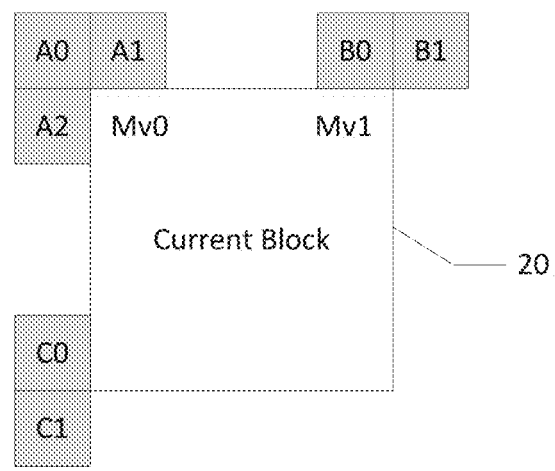
FIG. 2 illustrates an example of affine candidate derivation based on neighboring coded blocks for affine Inter mode or affine Merge mode.
Figure 3:
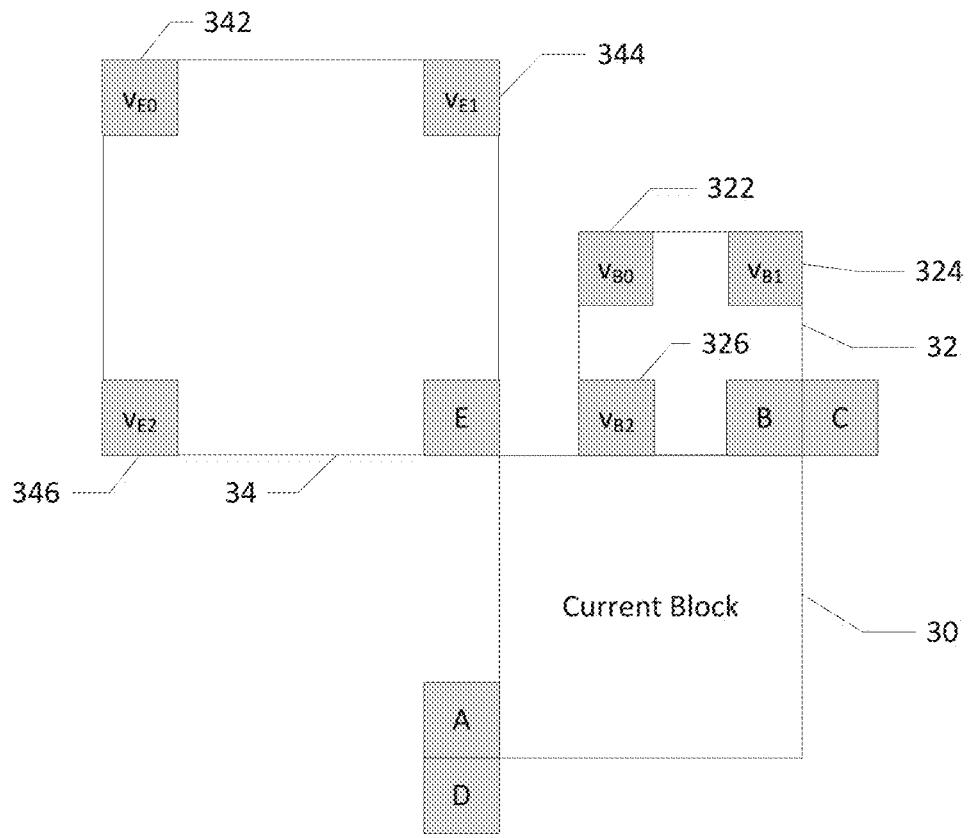
FIG. 3 illustrates an example of encoding or decoding a current block using information from a neighboring block according to affine Merge mode.

In order to process a block coded in affine Merge mode, a first available affine-coded neighboring block is determined according to the selection order of neighboring coded sub-blocks A, B, C, D and E shown in FIG. 3. FIG. 3 illustrates an example of encoding or decoding a current block 30 using information of a neighboring block according to affine Merge mode. In this example, two neighboring coded sub-blocks B and E of the current block 30 are coded in an affine mode. A neighboring block 32 including the neighboring coded sub-block B may be either affine Inter coded block or affine Merge coded block, similarly, a neighboring block 34 including the neighboring coded sub-block E may be either affine Inter coded block or affine Merge coded block. The first available affine-coded neighboring block in this example is the neighboring block 32.

The affine Merge candidate for predicting the current block 30 is derived from the motion vector $V_{B0}$ of a top-left N×N block 322, the motion vector $V_{B1}$ of a top-right N×N block 324 of the first available affine-coded neighboring block 32 if two control points are used in the affine mode. The affine Merge candidate is further derived from the motion vector $V_{B2}$ of a bottom-left N×N block 326 of the first available affine-coded neighboring block 32 if three control points are used in the affine mode. N×N is the smallest block size for storing an MV in the temporal MV buffer, for example, N equals to 4. In HEVC systems, only the motion vectors of the neighboring 4×4 block row and the neighboring 4×4 block column of the current coding unit (CU) or coding tree unit (CTU) and the motion vectors of the current CTU are stored. The CTU is also a term to define a largest coding unit (LCU) allowed in the video coding system. All other motion vectors are either discarded or down-sampled in ratio of 16:1 and stored in the buffer. A video coding system with affine motion compensation requires additional MV buffers to store motion vectors of neighboring coded blocks for affine candidate derivation.

Embodiments of buffer management for a video coding system are described in the following which implements affine motion compensation with reduced buffer requirements.

First Embodiment

In a first embodiment, a current block in a current picture is encoded or decoded by affine motion compensation according to an affine candidate including affine motion vectors. Each of the affine motion vectors predicts a motion vector at a control point of the current block as the affine motion vectors are used to predict a movement between a point of the current block and a corresponding point of an affine motion compensated block. A temporal MV buffer in the first embodiment stores motion vectors of a single neighboring N×N block row and a single neighboring N×N block column of the current block. N×N represents the smallest block size to store a motion vector in the temporal MV buffer, for example N is 4. In this embodiment, the number of MVs stored in the temporal MV buffer is the same as a conventional HEVC temporal MV buffer for MVP derivation. When the derivation of the affine candidate for the current block requires a motion vector at a control point of an affine-coded neighboring block, and the control point is not in the current CTU and not in the neighboring N×N block row or the neighboring N×N block column of the current block, a replacing motion vector is retrieved from a buffer to derived a corresponding affine motion vector instead of an original motion vector at the control point of the affine-coded neighboring block. The replacing motion vector is a down-sampled motion vector stored in the buffer, and this replacing motion vector represents the motion of the entire 16×16 block. The replacing motion vector may just be a motion vector used by a sub-block near the control point. For example, the replacing motion vector is corresponding to a sub-block that is belong to the same 16×16 block as the control point. Affine motion vectors in an affine candidate derived according to the first embodiment are typically not precise motion vector predictors since the down-sampled motion vectors sometimes do not reflect the real motion at control points of the neighboring block.

Second Embodiment

Figure 4A:
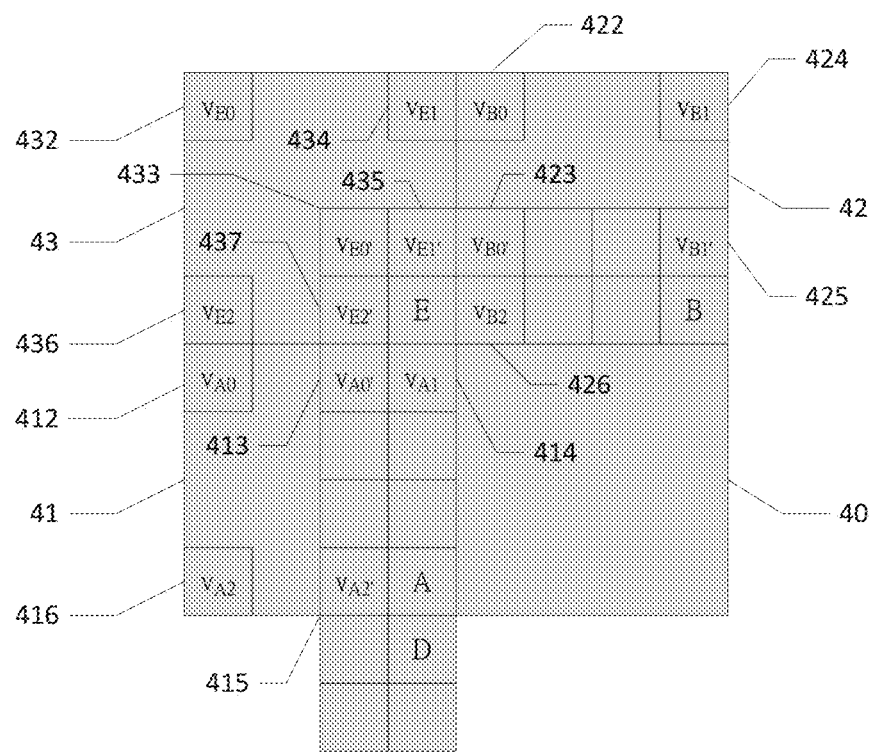
FIGS. 4A and 4B illustrate two examples of storing MVs of two neighboring block rows and two neighboring block columns for affine candidate derivation according to embodiments of the present invention.
Figure 4B:
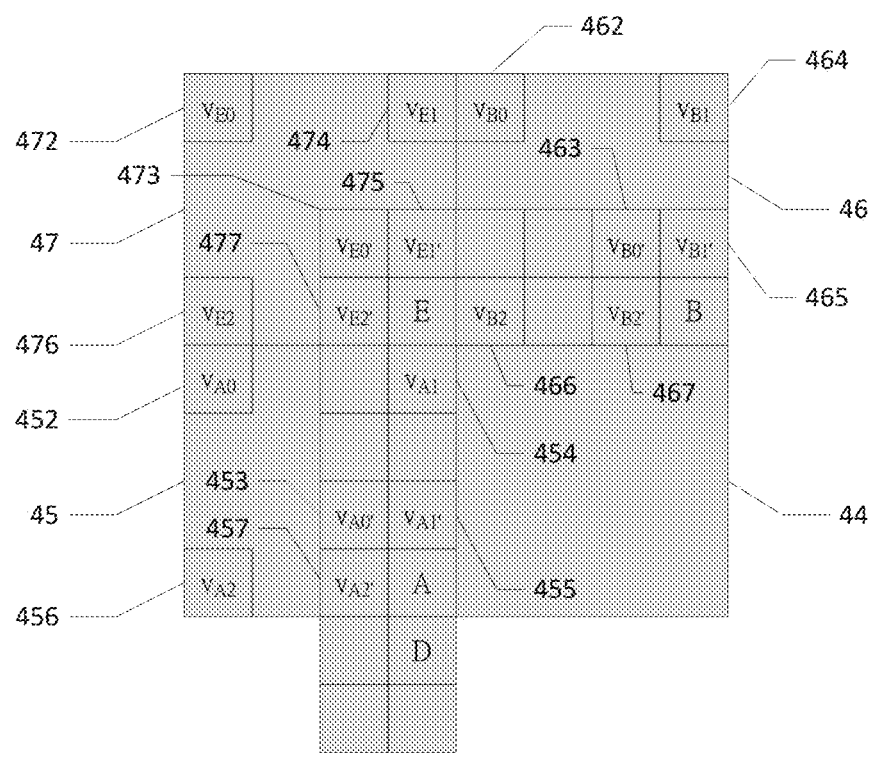

A second embodiment stores more motion vectors in the temporal MV buffer by storing MVs of M neighboring N×N block rows and MVs of K neighboring N×N block columns. In this embodiment, M and K are integers greater than or equal to 2, and N is an integer greater than 1. Instead of storing all motion vectors of the coded blocks in the current picture in the temporal MV buffer, selective motion vectors less than all motion vectors of the coded blocks in the current picture are stored. The selective motion vectors are MVs of M block rows and K block columns, where the number of block rows M should be less than the height of a largest coding tree unit divided by N (1<M<CTU_height/N). The N×N block refers to the smallest block size for storing an MV in the temporal MV buffer. In an example of the second embodiment, both M and K are 2 as shown in FIG. 4A and FIG. 4B. The temporal buffer in this example stores motion vectors of first and second neighboring N×N block rows closest to a top boundary of the current block and the temporal buffer also stores motion vectors of first and second neighboring N×N block columns closest to a left boundary of the current block. FIG. 4A and FIG. 4B illustrate two examples of affine candidate derivation for a current block coded in affine mode using two neighboring block rows and two neighboring block columns. If motion vectors at control points of a neighboring block are not stored in the temporal MV buffer as the corresponding sub-blocks are not in the two neighboring block rows and not in the two neighboring block columns, some replacing motion vectors are retrieved to derive affine motion vectors in the affine candidate.

In the example shown in FIG. 4A, neighboring coded blocks 41, 42 and 43 of a current block 40 are all coded in affine mode. Replacing motion vectors $V_{B0'}$ and $V_{B1'}$ of sub-blocks 423 and 425 in a second neighboring block row above the current block 40 are used to derive affine motion vectors in the affine candidate instead of original motion vectors $V_{B0}$ and $V_{B1}$ of sub-blocks 422 and 424 in a first row of the neighboring coded block 42. Replacing motion vectors $V_{E0'}$, $V_{E1'}$ and $V_{E2'}$ of sub-blocks 433, 435, 437 in either the second neighboring block row above the current block 40 or a second neighboring block column on the left of the current block 40 are used to derive affine motion vectors instead of original motion vectors $V_{E0}$, $V_{E1}$ and $V_{E2}$ of sub-blocks 432, 434 and 436. Replacing motion vectors $V_{A0'}$ and $V_{A2'}$ of sub-blocks 413 and 415 in the second neighboring block column on the left of the current block 40 are used to derive the affine motion vectors instead of original motion vectors $V_{A0}$ and $V_{A2}$ of sub-block 412 and 416 in a first column of the neighboring coded block 41. Original motion vectors $V_{B2}$ and $V_{A1}$ of sub-blocks 426 and 414 are used to derive the affine motion vectors for the current block 40 because these two sub-blocks 426 and 414 are within the first and second neighboring block rows or the first and second neighboring block columns of the current block 40. The derived affine motion vectors in the affine candidate are used to predict a movement between points of the current block 40 and corresponding points of one or more compensated blocks using an affine motion model.

FIG. 4B is an alternative solution to the affine candidate derivation method illustrated in FIG. 4A. In FIG. 4B, when deriving an affine candidate for encoding or decoding a current block 44, all the original motion vectors at control points of a neighboring affine-coded block are replaced by motion vectors of other sub-blocks in first and second neighboring block rows and first and second neighboring block columns of the current block 44. The control points for an affine-coded block predicted by a six-parameter affine motion model include upper-left corner, upper-right corner, and lower-left corner of the affine-coded block. Replacing motion vectors $V_{B0'}$, $V_{B1'}$ and $V_{B2'}$ of sub-blocks 463, 465 and 467 in a neighboring affine-coded block 46 are used to derive the affine motion vectors instead of using original motion vectors $V_{B0}$, $V_{B1}$ and $V_{B2}$ of sub-blocks 462, 464 and 466. Replacing motion vectors $V_{E0'}$, $V_{E1'}$ and $V_{E2'}$ of sub-blocks 473, 475 and 477 in a neighboring affine-coded block 47 are used to derive the affine motion vectors instead of original motion vectors $V_{E0}$, $V_{E1}$ and $V_{E2}$ of sub-blocks 472, 474 and 476. Replacing motion vectors $V_{A0'}$, $V_{A1'}$ and $V_{A2'}$ of sub-blocks 453, 455 and 457 in a neighboring affine-coded block 45 are used to derive the affine motion vectors instead of original motion vectors $V_{A0}$, $V_{A0}$ and $V_{A2}$ of sub-blocks 452, 454 and 456. In general, other positions in the M neighboring block rows and the K block columns may be used for affine candidate derivation in this embodiment.

Without loss of generality, only the affine candidate derivation method illustrated in FIG. 4A is further described in the following. In a first example, an affine candidate including three affine motion vectors Mv0, Mv1 and Mv2 are derived for predicting the current block 40 using a six-parameter affine motion model. In the first example, the affine motion vectors of the affine candidate are derived from the neighboring affine-coded block 42. Affine motion vector Mv0=(V0_x, V0_y) for a first control point at an upper-left corner is derived by Equation (6).

$$V_{0\_x} = \qquad\qquad\qquad\qquad\qquad\qquad\qquad\qquad (6)$$
$$V_{B0'\_x} + (V_{B2\_x} - V_{B0'\_x})*(posCurPU\_Y - posB0'\_Y)/(2*N) +$$
$$(V_{B1'\_x} - V_{B0'\_x})*(posCurPU\_X - posB0'\_X)/RefPU\_width,$$
$$V_{0\_y} = V_{B0'\_y} + (V_{B2\_y} - V_{B0'\_y})*$$
$$(posCurPU\_Y - posB0'\_Y)/(2*N) +$$
$$(V_{B1'\_y} - V_{B0'\_y})*(posCurPU\_X - posB0'\_X)/RefPU\_width;$$

where motion vectors $V_{B0'}=(V_{B0'\_x}, V_{B0'\_y})$, $V_{B1'}=(V_{B1'\_x}, V_{B1'\_y})$, and $V_{B2}=(V_{B2\_x}, V_{B2\_y})$ are the three motion vectors retrieved from M neighboring N×N block rows and K neighboring N×N block columns. It is also to be understood that these motion vectors can be replaced by corresponding motion vectors of any other selected sub-blocks in the M neighboring N×N block rows and K neighboring N×N block columns of the current block. A coordinate (posCurPU_X, posCurPU_Y) represents a pixel position of an upper-left corner sample of the current block 40 relative to an upper-left corner sample of the current picture. A coordinate (posB0'_X, posB0'_Y) represents a pixel position of an upper-left corner sample of the sub-block 422 relative to the upper-left corner sample of the current picture. RefPU_width represents the width of the neighboring block 42. Affine motion vectors Mv1=($V_{1\_x}$, $V_{1\_y}$) and Mv2=($V_{2\_x}$, $V_{2\_y}$) for second and third control points at upper-right and lower-left corner respectively are derived by Equation (7).

$$V_{1\_x}=V_{0\_x}+(V_{B1'\_x}-V_{B0'\_x})*PU\_width/RefPU\_width,$$
$$V_{1\_y}=V_{0\_y}+(V_{B1'\_y}-V_{B0'\_y})*PU\_width/RefPU\_width;$$
$$V_{2\_x}=V_{0\_x}+(V_{B2\_x}-V_{B0'\_x})*PU\_height/(2*N),$$
$$V_{2\_y}=V_{0\_y}+(V_{B2\_y}-V_{B0'\_y})*PU\_height/(2*N); \qquad (7)$$

where PU_width and PU_height represent the width and height of the current block 40.

In a second example, an affine candidate including two affine motion vectors Mv0 and Mv1 is derived for predicting the current block 40 using a four-parameter affine motion model. The second example also uses the motion vectors from the neighboring affine-coded block 42 to derive the affine candidate. Affine motion vectors Mv0=(V0_x, V0_y) and Mv1=(V1_x, V1_y) for first and second control points at upper-left and upper-right corners respectively are derived by Equation (8).

$$V_{0\_x} = V_{B0'\_x} - \qquad (8)$$
$$(V_{B1'\_y} - V_{B0'\_y}) * (\text{posCurPU\_Y} - \text{posB0'\_Y})/\text{RefPU\_width} +$$
$$(V_{B1'\_x} - V_{B0'\_x}) * (\text{posCurPU\_X} - \text{posB0'\_X})/\text{RefPU\_width};$$
$$V_{0\_y} = V_{B0'\_y} + (V_{B1'\_x} - V_{B0'\_x}) *$$
$$(\text{posCurPU\_Y} - \text{posB0'\_Y})/\text{RefPU\_width} +$$
$$(V_{B1'\_y} - V_{B0'\_y}) * (\text{posCurPU\_X} - \text{posB0'\_X})/\text{RefPU\_width};$$
$$V_{1\_x} = V_{0\_x} + (V_{B1'\_x} - V_{B0'\_x}) * \text{PU\_width}/\text{RefPU\_width};$$
$$V_{1\_y} = V_{0\_y} + (V_{B1'\_y} - V_{B0'\_y}) * \text{PU\_width}/\text{RefPU\_width}.$$

Considering the line buffer of storing motion vectors of top CTUs is much larger than the column buffer of storing motion vectors of a left CTU, in one example, there is no need to constrain the value of K in this second embodiment, all motion vectors of the left CTU are stored by setting K equals to the width of a largest coding unit divided by N (K=CTU_width/N).

Third Embodiment

In a third embodiment, affine parameters or control points for every fixed size block or every CU are deliberately stored. In Equation (3), the motion vector Mv0=($V_{0x}$, $V_{0y}$) of a top-left N×N sub-block and the motion vector Mv1= ($V_{1x}$, $V_{1y}$) of a top-right N×N sub-block are used to derive motion vectors of all N×N sub-blocks in the current block. The current block is either a coding unit (CU) or a prediction unit (PU). The derived motion vectors can be represented by the motion vector Mv0 plus a position dependent MV offset. From Equation (3), for deriving a motion vector for an N×N sub-block at position (x,y), a horizontal direction MV offset H_MV_offset and a vertical direction MV offset V_MV_offset are shown in Equation (9).

$$H\_MV\_\text{offset}=(V_{1x}-V_{0x})*N/w, (V_{1y}-V_{0y})*N/w;$$
$$V\_MV\_\text{offset}=-(V_{1y}-V_{0y})*N/w, (V_{1x}-V_{0x})*N/w. \qquad (9)$$

For a six-parameter affine motion model, the motion vector Mv0=($V_{0x}$, $V_{0y}$) of a top-left N×N sub-block, the motion vector Mv1=($V_{1x}$, $V_{1y}$) of a top-right N×N sub-block, and the motion vector Mv2=($V_{2x}$, $V_{2y}$) of a bottom-left N×N sub-block are used to derive motion vectors of all N×N sub-blocks in the current block. The motion vector field of each pixel A(x,y) in the current block may be derived based on the three motion vectors Mv0, Mv1 and Mv2 according to Equation (10).

$$\begin{cases} v_x = \frac{(v_{1x}-v_{0x})}{w}x - \frac{(v_{2x}-v_{0x})}{h}y + v_{0x} \\ v_y = \frac{(v_{1y}-v_{0y})}{w}x + \frac{(v_{2y}-v_{0y})}{h}y + v_{0y} \end{cases} \qquad (10)$$

Similarly, for deriving a motion vector ($V_x$, $V_y$) of an N×N sub-block at position (x,y) according to the six-parameter affine motion model, a horizontal direction MV offset H_MV_offset and a vertical direction MV offset H_MV_offset are shown in Equation (11).

$$H\_MV\_\text{offset}=(v_{1x}-v_{0x})*N/w, (v_{1y}-v_{0y})*N/w;$$
$$V\_MV\_\text{offset}=(v_{2x}-v_{0x})*N/h, (v_{2y}-v_{0y})*N/h; \qquad (11)$$

where w and h in Equations (9) and (11) are the width and height of the current block coded in affine mode.

In the case of assigning a motion vector at a center pixel of an N×N sub-block as a motion vector of the control point, the denominator in Equations (6) and (8) is decreased by N. For example, Equation (6) may be rewritten as follow.

$$V_{0\_x} = V_{B0'\_x} + (V_{B2\_x} - V_{B0'\_x}) * (\text{posCurPU\_Y} - \text{posB0'\_Y})/(N) + \qquad (12)$$
$$(V_{B1'\_x} - V_{B0'\_x}) *$$
$$(\text{posCurPU\_X} - \text{posB0'\_X})/(\text{RefPU\_width} - N)$$
$$V_{0\_y} = V_{B0'\_y} + (V_{B2'\_y} - V_{B0'\_y}) * (\text{posCurPU\_Y} - \text{posB0'\_Y})/(N) +$$
$$(V_{B1'\_y} - V_{B0'\_y}) *$$
$$(\text{posCurPU\_X} - \text{posB0'\_X})/(\text{RefPU\_width} - N)$$

The third embodiment stores affine parameters such as the horizontal and vertical direction MV offsets for the coded block. The coded block may be either a fixed size M×M block or a coding unit (CU). The size of the fixed size M×M block may depend on the minimum size allowed for applying affine motion prediction. In an example, M is 8 if the smallest affine Inter mode or affine Merge mode block size is 8×8. For each M×M block or for each CU, the affine parameters including a horizontal direction MV offset ($V_{1x}$-$V_{0x}$)*N/w, ($V_{1y}$-$V_{0y}$)*N/w and one motion vector of an N×N sub-block such as Mv0 ($V_{0x}$,$V_{0y}$) are stored for the four-parameter affine motion model that uses upper-left and upper-right control points. The affine parameters including a vertical direction MV offset ($V_{2x}$-$V_{0x}$)*N/h, ($V_{2y}$-$V_{0y}$)*N/h and one motion vector of an N×N sub-block such as Mv0 ($V_{0x}$,$V_{0y}$) are stored for the four-parameter affine motion model that uses upper-left and lower-left control points. If the six-parameter affine motion model that uses upper-left, upper-right, and lower-left control points is applied, the affine parameters including both the horizontal direction MV offset ($V_{1x}$-$V_{0x}$)*N/w, ($V_{1y}$-$V_{0y}$)*N/w and vertical direction MV offset ($V_{2x}$-$V_{0x}$)*N/h, ($V_{2y}$-$V_{0y}$)*N/h, as well as one motion vector of an N×N sub-block such as Mv0 ($V_{0x}$,$V_{0y}$) are stored. The affine motion vectors in the affine candidate may be derived by the stored affine parameters of one or more M×M blocks or CUs corresponding to the neighboring block.

In order to preserve the precision, the horizontal or vertical MV offset is multiplied by a scale number, where the scale number may be a predefined number or the scale number may set equal to the largest coding unit or the CTU size. For example, a scaled horizontal direction MV offset (($V_{1x}$-$V_{0x}$)*S/w, ($V_{1y}$-$V_{0y}$)*S/w) and a scaled vertical direction MV offset (($V_{2x}$-$V_{0x}$)*S/h, ($V_{2y}$-$V_{0y}$)*S/h) are stored. Some examples of the scale number S is set equal to the CTU size or a quarter of the CTU size.

In another example, the motion vectors of two or three control points of each M×M block or each CU are stored. The motion vectors may be stored in a line buffer. The affine motion vectors in the affine candidate for predicting a current block are derived by the stored motion vectors of the control points corresponding to the neighboring block.

Figure 5:
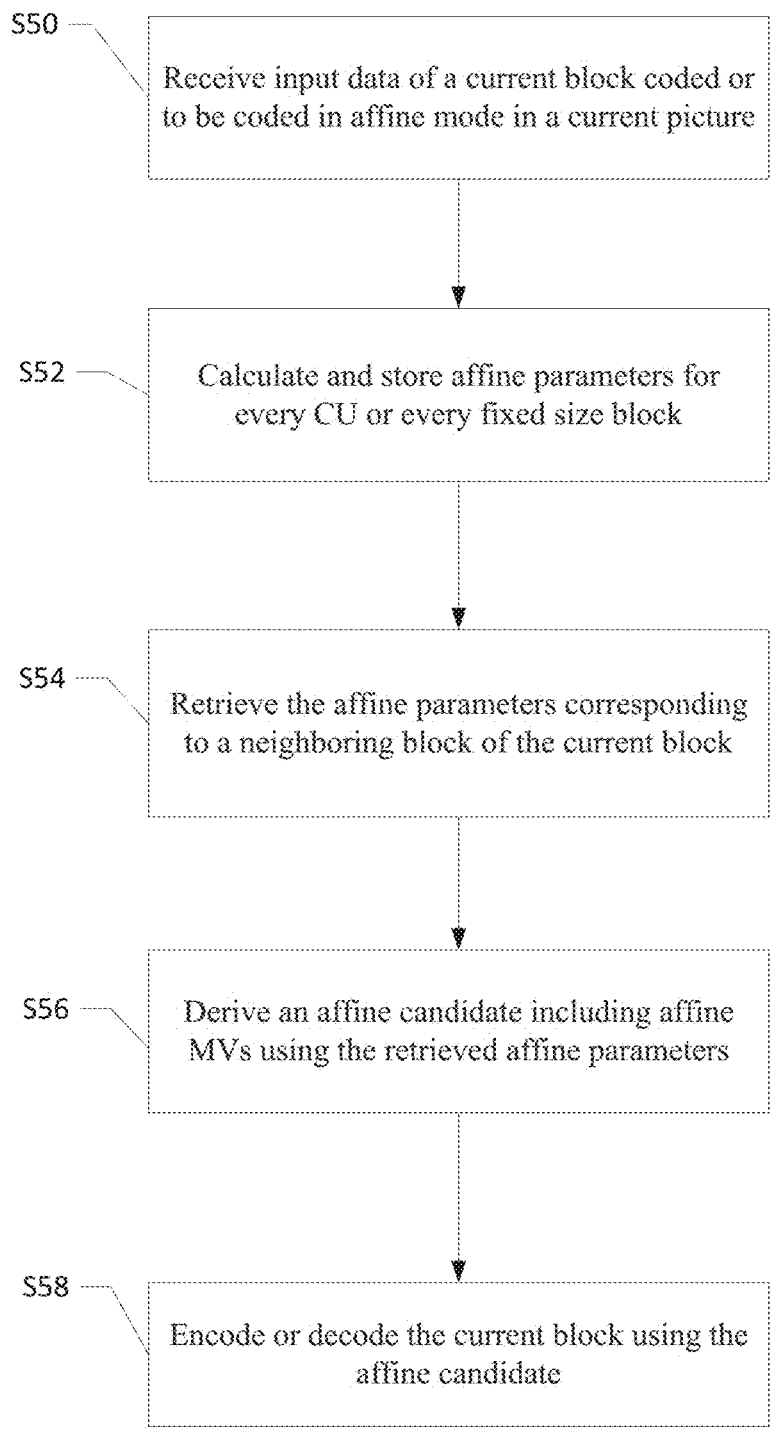
FIG. 5 illustrates an exemplary flowchart for a video coding system with affine motion compensation incorporating an embodiment of the present invention.

FIG. 5 illustrates an exemplary flowchart for a video coding system with affine motion compensation incorporating the third embodiment of the present invention. The input data associated with a current block coded or to be coded in affine mode are received by the video coding system in step S50. The video coding system calculates and stores affine parameters for the neighboring blocks in step S52 and retrieves the affine parameters corresponding to a neighboring block of the current block in step S54. An affine candidate including affine motion vectors is derived according to the retrieved affine parameters in step S56. The video coding system then encodes or decodes the current block in the affine mode using the affine candidate in step S58.

Fourth Embodiment

In the fourth embodiment, compared to the conventional temporal MV buffer for HEVC, motion vectors in one more N×N block row and one more N×N block column are stored in the temporal MV buffer for affine motion compensation. The concept of the fourth embodiment is similar to the second embodiment, but original motion vectors of sub-blocks located in the top row and the left-most column of one or more neighboring coded blocks are stored instead of replacing motion vectors in the sub-blocks located closer to the current block. The temporal buffer in this embodiment stores original motion vectors of a first neighboring N×N block row, a first neighboring N×N block column, a top N×N block row set and a left-most N×N block column set. The first neighboring N×N block row is a last row in one or more upper neighboring blocks that is closest to a top boundary of the current block, and the first neighboring N×N block column is a last column in one or more left neighboring blocks that is closest to a left boundary of the current block. The top N×N block row set comprises a first row in one or more upper neighboring blocks and the left-most N×N block column set comprises a first column in one or more left neighboring blocks.

Figure 6:
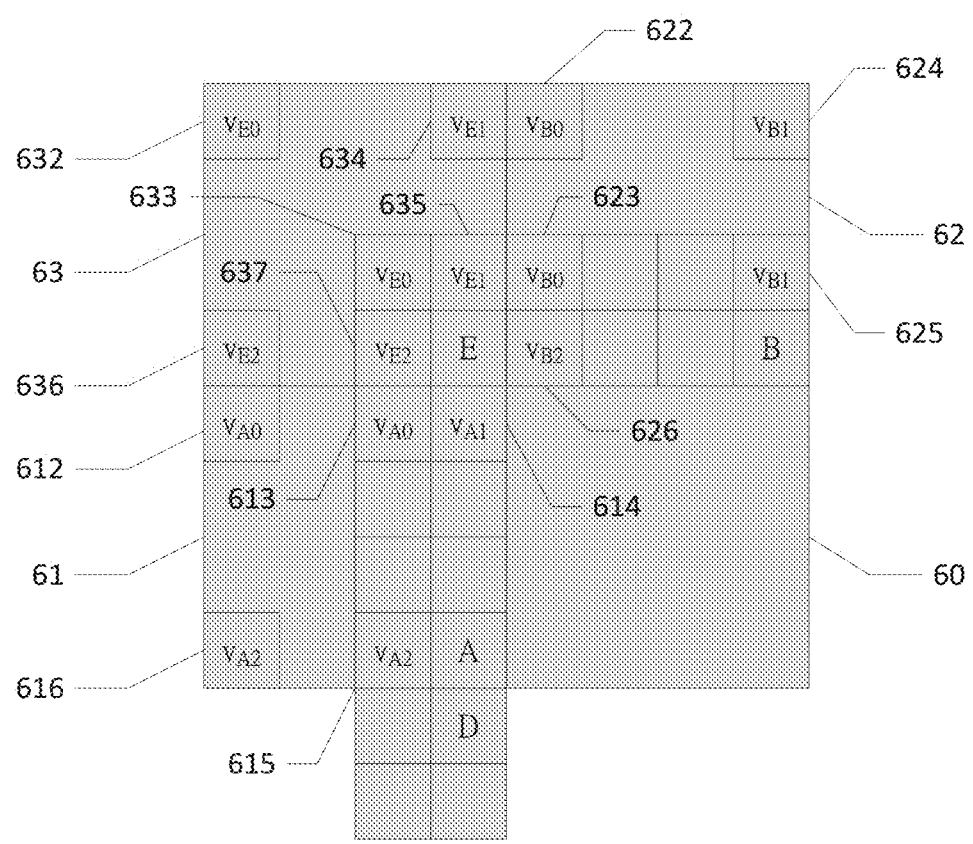
FIG. 6 illustrates an example of storing original MVs at control points of neighboring blocks for affine candidate derivation according to an embodiment of the present invention.

FIG. 6 illustrates an example of affine candidate derivation by storing motion vectors of 2 N×N block rows and 2 N×N block columns. As shown in FIG. 6, original motion vectors $V_{A1}$ and $V_{B2}$ of sub-blocks 614 and 626 in a first N×N block column adjacent to the left block boundary of a current block 60 and a first N×N block row above the current block 60 are stored in the buffer. The first N×N block column and the first N×N block row in neighboring blocks 61, 62 and 63 are the closest column and row to the current block 60. Original motion vectors $V_{A2}$, $V_{A0}$, $V_{E2}$, $V_{E0}$, $V_{E1}$, $V_{B0}$, and $V_{B1}$ of sub-blocks 616, 612, 636, 632, 634, 622 and 624 in the left-most N×N block column of neighboring blocks 61 and 62 or the top N×N block row of neighboring blocks 62 and 63 are also stored in the buffer. For example, these original motion vectors $V_{A2}$, $V_{A0}$, $V_{E2}$, $V_{E0}$, $V_{E1}$, $V_{B0}$, and $V_{B1}$ of the left-most N×N block column or the top N×N block row of the neighboring blocks overwrite the buffer space for storing motion vectors of sub-blocks 615, 613, 637, 633, 635, 623 and 625 in a second N×N block row and a second N×N block column. In this embodiment, the original motion vectors at the control points of neighboring blocks are stored in the temporal MV buffer with an overhead of only one additional MV row and one additional MV column.

Figure 7:
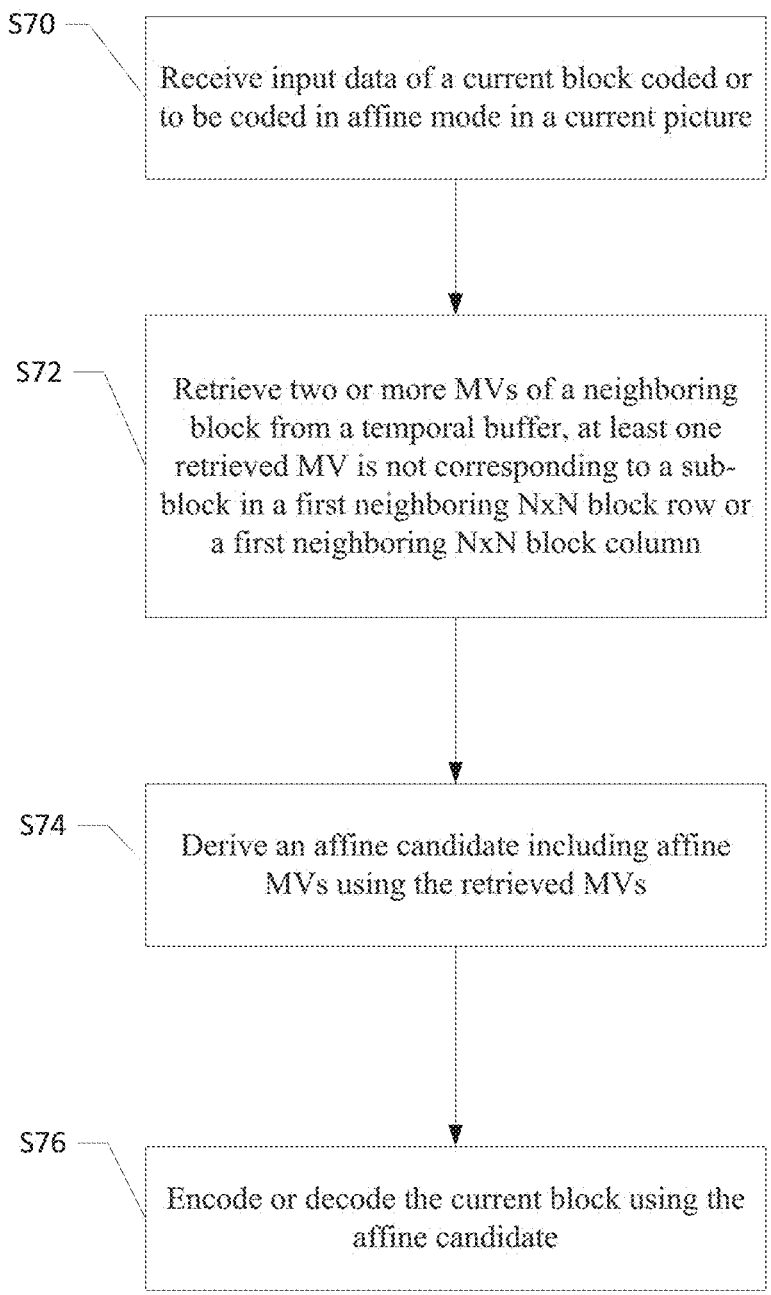
FIG. 7 illustrates an exemplary flowchart for a video coding system with affine motion compensation incorporating embodiments of the present invention.

FIG. 7 illustrates an exemplary flowchart for a video coding system with affine motion compensation incorporating the second or the fourth embodiments of the present invention. The input data associated with a current block in a current picture is received at a video encoder side or a video bitstream corresponding to compressed data including the current block is received at a video decoder side in step S70. Step S72 retrieves two or more motion vectors of neighboring block from a temporal buffer, where at least one retrieved motion vector is not corresponding to a sub-block in a first neighboring N×N block row or a first neighboring N×N block column of the current block. The video coding system derives an affine candidate using the retrieved motion vectors in step S74, and encodes or decodes the current block by predicting the current block using one or more motion compensated blocks by the derived affine candidate in step S76. The affine motion vectors predict movements between points of the current block and corresponding points of the one or more motion compensated block. The temporal buffer stores selective motion vectors less than all motion vectors of coded blocks in the current picture. At least one of the retrieved motion vectors is a replacing motion vector according to the second embodiment, and all the retrieved motion vectors are original motion vectors at control points of the neighboring block according to the fourth embodiment.

Fifth Embodiment

Figure 8:
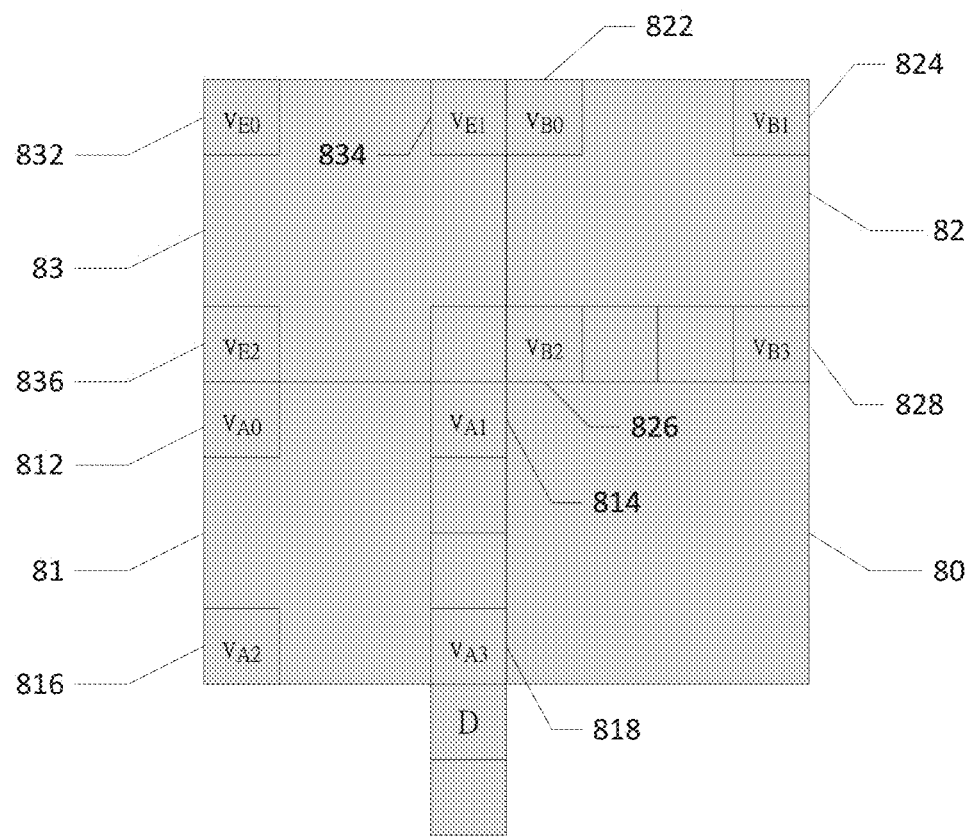
FIG. 8 illustrates an example of storing MVs of a closest neighboring block row and closest neighboring block column for affine candidate derivation according to an embodiment of the present invention.

In the fifth embodiment, the video coding system with affine motion compensation reuses the conventional temporal MV buffer required by the HEVC standard so no additional buffer is required. In other words, affine motion prediction only needs motion vectors of one neighboring N×N block row and one neighboring N×N block column in this embodiment. FIG. 8 illustrates an example of affine candidate derivation using motion vectors of one neighboring N×N block row and one neighboring N×N block column. As shown in FIG. 8, two motion vectors in the closest N×N block row or the closest N×N block column in a neighboring block of a current block 80 are used to derive an affine candidate for the current block. For example, when the neighboring block 82 above the current block 80 is selected for deriving the affine candidate, motion vectors $V_{B2}$ and $V_{B3}$ in sub-blocks 826 and 828 are retrieved for deriving affine motion vectors in the affine candidate according to a four-parameter affine motion model; when the neighboring block 81 on the left side of the current block 80 is selected for deriving the affine candidate, motion vectors $V_{A1}$ and $V_{A3}$ in sub-blocks 814 and 818 are retrieved for deriving affine motion vectors in the affine candidate according to the four-parameter affine motion model. The neighboring block 83 adjacent to an upper-left corner of the current block 80 is not a valid neighboring block for affine candidate derivation in this embodiment.

Equation (13) demonstrates an example of modifying Equation (8) for deriving the affine motion vectors Mv0 and Mv1 in the affine candidate from the motion vectors VB2 and VB3 in the neighboring block 82 according to a four-parameter affine motion model.

$$V0\_x = VB2\_x - (VB3\_y - VB2\_y)*(posCurPU\_Y - posB2\_Y)/ \\ RefPUB\_width + (VB3\_x - VB2\_x)* \\ (posCurPU\_X - posB2\_X)/RefPUB\_width,$$

$$V0\_y = VB2\_y + (VB3\_x - VB2\_x)*(posCurPU\_Y - posB2\_Y)/ \\ RefPUB\_width + (VB3\_y - VB2\_y)* \\ (posCurPU\_X - posB2\_X)/RefPUB\_width;$$

(13)

-continued $$V1\_x = V0\_x + (VB3\_x - VB2\_x) * PU\_width/RefPUB\_width,$$

$$V1\_y = V0\_y + (VB3\_y - VB2\_y) * PU\_width/RefPUB\_width;$$

where (V0_x, V0_y) represents the motion vector Mv0 on the upper-left corner of the current block 80, and (V1_x, V1_y) represents the motion vector Mv1 on the upper-right corner of the current block 80. A coordinate (posCurPU_X, posCurPU_Y) represents a pixel position of an upper-left corner sample of the current block 80 relative to an upper-left corner sample of the current picture. A coordinate (posB2_X, posB2_Y) represents a pixel position of a bottom left sample of the sub-block 826 relative to the upper-left corner sample of the current picture. RefPUB_width represents the width of the neighboring block 82 and PU_width represents the width of the current block 80.

The sixth to ninth embodiments described in the following are related to implementing Adaptive Motion Vector Resolution (AMVR) with affine motion compensation. AMVR provides a flexible scheme to reduce motion vector difference (MVD) transmission overhead by adaptively restricting MVD to integer pixel resolution. An AMVR flag is signaled for a coding unit (CU) or a prediction unit (PU) to indicate whether integer pixel resolution is used or fractional pixel resolution is used. An implementation of affine motion compensation disclosed in the literature proposes not to signal the AMVR flag for CU or PU coded in an affine mode, so AMVR is always disabled for affine coded blocks. Affine motion vectors for all control points in an affine-coded block are in fractional pixel resolution by default.

Sixth Embodiment

In the sixth embodiment, adaptive motion vector resolution is enabled with affine motion compensation and an AMVR flag is signaled for each affine-coded block. The AMVR flag in one example only controls the resolution of MVDs for the affine-coded block to be integer pixel resolution or fractional pixel resolution. The AMVR flag in another example controls the resolution of MVDs as well as the resolution of motion vector predictors (MVPs) for the affine-coded block so the final motion vectors are in integer resolution if the AMVR flag indicates an integer pixel resolution is used. For a current block coded in an affine mode such as affine Inter mode, there are M MVDs calculated from M corresponding MVPs, where M refers to the number of control points for the current block. M in this example is selected from 0, 1, 2, 3, and 4. The M corresponding MVPs are affine motion vectors in an affine candidate, and each affine motion vector is a predictor for a motion vector at one control point for the affine-coded block. If the current block is coded in affine Inter mode and the AMVR flag is true, indicating integer pixel resolution is used for the current block, the MVDs of the control points are in integer pixel resolution. In the case where the AMVR flag is also used to regulate the resolution of MVPs, all the MVPs associated with the MVDs of the control points are also rounded to integer pixel resolution if the AMVR flag is true. In the case where the AMVR flag is only used to regulate the resolution of MVDs, the MVPs associated with the MVDs of the control points may be fractional pixel resolution when the AMVR flag is true. For those control points without an associated MVD, that is when the MVD is inferred to be zero, the MVPs for the control points may still be in fractional pixel resolution.

Seventh Embodiment

In the seventh embodiment, MVDs are signaled before a corresponding AMVR flag in syntax design, and for an affine coded block, if there is at least one non-zero MVD for the control points of the affine coded block, the pixel resolution of the at least one non-zero MVD or at least one decoded motion vector is determined according to the AMVR flag. The decoded motion vector is derived by summing the MVD and a corresponding MVP in an affine candidate selected for the affine coded block. If the MVDs for all control points of the affine coded block are zero, the MVPs of the control points may remain in fractional pixel resolution, and the AMVR flag is not necessary to be signaled in the video bitstream.

Eighth Embodiment

In this embodiment, a block coded in affine Inter mode is restricted to uni-directional prediction by disabling bi-directional prediction to reduce the system complexity and MVD overhead. For example, if an affine flag indicates a current block is coded or to be coded in affine Inter mode, an Inter prediction direction interDir for the current block is set to either 0 or 1, where 0 indicates List 0 uni-directional prediction and 1 indicates List 1 uni-directional prediction. In one example of the eighth embodiment, bi-directional prediction is allowed for an affine Inter coded block only if MVDs of the affine Inter coded block are in integer pixel resolution. In other words, enabling or disabling of bi-directional prediction for an affine Inter coded block depends on the value of an AMVR flag for the affine Inter coded block. The MVD overhead is relatively small when an AMVR flag indicates the MVDs of the affine Inter coded block is in integer pixel resolution, so bi-directional prediction is allowed for the affine Inter coded block.

Ninth Embodiment

A video coding method or a video coding system implementing the ninth embodiment determines the motion vector resolution for a current block according to an Inter prediction direction interDir of the current block and whether the current block is coded in affine Inter mode. In this embodiment, the Inter prediction direction interDir and an affine flag for the current block are signaled prior to an AMVR flag for the current block in the CU syntax structure, so when interDir is equal to 2, indicating bi-direction prediction is applied for the current block, and the affine flag is true, indicating affine Inter mode is used, the AMVR flag is inferred to be true and not necessary to be signaled for the current block.

Figure 9:
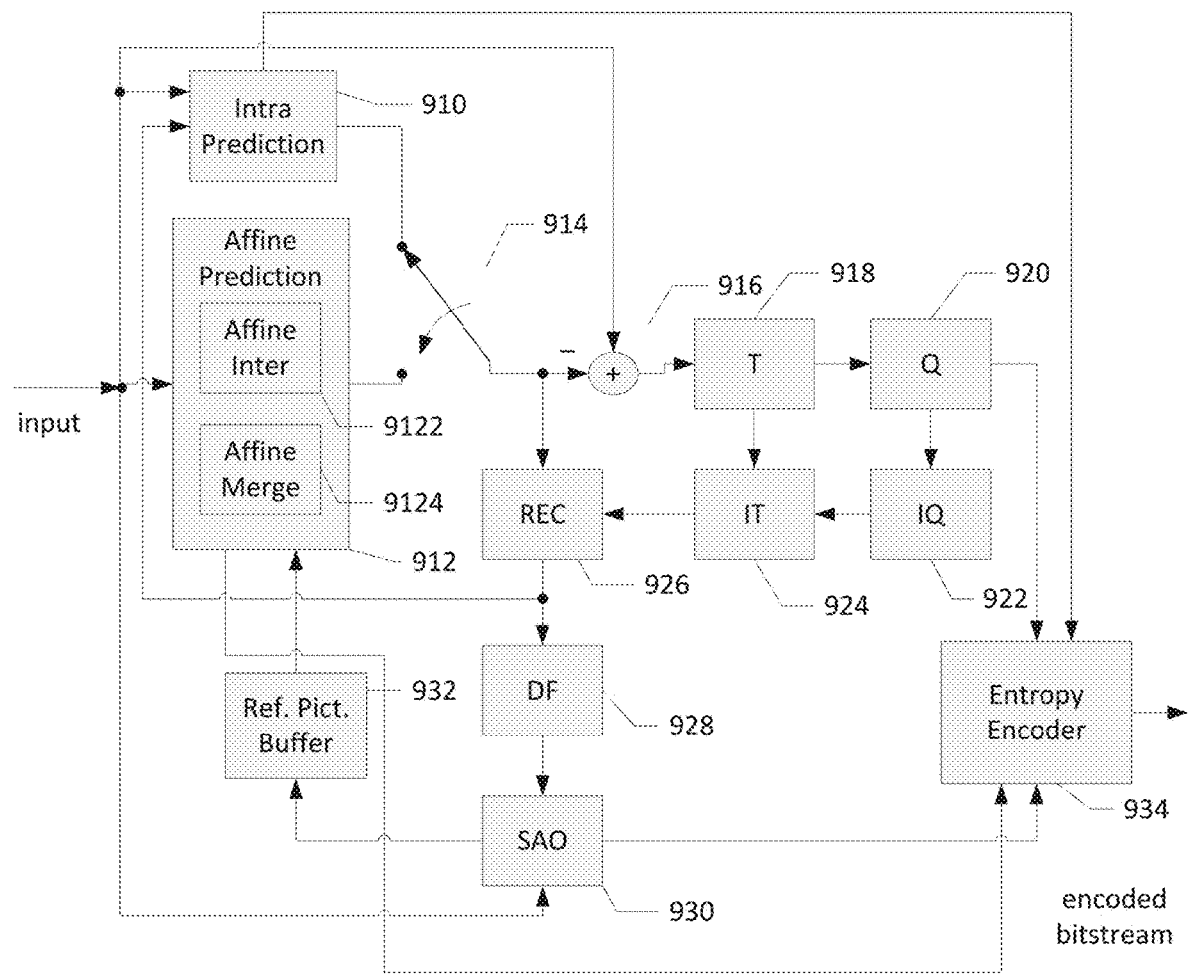
FIG. 9 illustrates an exemplary system block diagram for a video encoder implementing an affine motion prediction and compensation according to various embodiments of the present invention.

FIG. 9 illustrates an exemplary system block diagram for a Video Encoder 900 based on High Efficiency Video Coding (HEVC) with affine motion compensation according to an embodiment of the present invention. Intra Prediction 910 provides intra predictors based on reconstructed video data of a current picture, whereas Affine Prediction 912 performs motion estimation (ME) and motion compensation (MC) according to an affine motion model to provide predictors based on video data from other pictures. Each block in the current picture processed by Affine Prediction 912 selects to be encoded in affine Inter mode by Affine Inter Prediction 9122 or to be encoded in affine Merge mode by Affine Merge prediction 9124. For a block encoded in affine Inter mode or affine Merge mode, a final affine candidate is selected from one or more affine candidate to derive one or more compensated blocks using the affine motion model derived by the final affine candidate, and the one or more compensated blocks are used to predict the block. The affine candidate may be derived using one of the embodiments with a temporal MV buffer which stores selective motion vectors less than all motion vectors of coded blocks in the current picture. The Affine Merge Prediction 9124 constructs one or more affine Merge candidates according to motion vectors of one or more neighboring coded blocks and inserts the one or more affine Merge candidates in a Merge candidate list. Affine Merge mode allows the inheritance of affine motion vectors at control points from the neighboring coded block; therefore motion information is only signaled by a merge index. The merge index for selecting the final affine candidate is then signaled in an encoded video bitstream. The affine Merge candidate may be derived using one of the embodiments of the present invention. For a block coded in affine Inter mode, motion information such as Motion vector difference (MVD) between the affine motion vectors in the final affine candidate and motion vectors at control points of the block are coded in the encoded video bitstream. A resolution of the MVD for the block coded in affine Inter mode is either integer pixel resolution or fractional pixel resolution according to an embodiment of the present invention. Switch 914 selects one of the outputs from Intra Prediction 910 and Affine Prediction 912 and supplies the selected predictor to Adder 916 to form prediction errors, also called prediction residual signal.

The prediction residual signal is further processed by Transformation (T) 918 followed by Quantization (Q) 920. The transformed and quantized residual signal is then coded by Entropy Encoder 934 to form the encoded video bitstream. The encoded video bitstream is then packed with side information such as the Merge index and the MVD. The data associated with the side information are also provided to Entropy Encoder 934. When motion compensation prediction mode is used, a reference picture or pictures have to be reconstructed at the encoder end as well. The transformed and quantized residual signal is processed by Inverse Quantization (IQ) 922 and Inverse Transformation (IT) 924 to recover the prediction residual signal of the reference picture or pictures. As shown in FIG. 9, the prediction residual signal is recovered by adding back to the selected predictor at Reconstruction (REC) 926 to produce reconstructed video data. The reconstructed video data may be stored in Reference Picture Buffer (Ref. Pict. Buffer) 932 and used for prediction of other pictures. The reconstructed video data from REC 926 may be subject to various impairments due to the encoding processing, consequently, in-loop processing Deblocking Filter (DF) 928 and Sample Adaptive Offset (SAO) 930 is applied to the reconstructed video data before storing in the Reference Picture Buffer 932 to further enhance picture quality. DF information from DF 928 and SAO information from SAO 930 are also provided to Entropy Encoder 934 for incorporation into the encoded video bitstream. The temporal MV buffer for storing motion vectors for affine candidate derivation may be implemented in Ref. Pict. Buffer 932 or any other memory coupling with the Affine Prediction 912.

Figure 10:
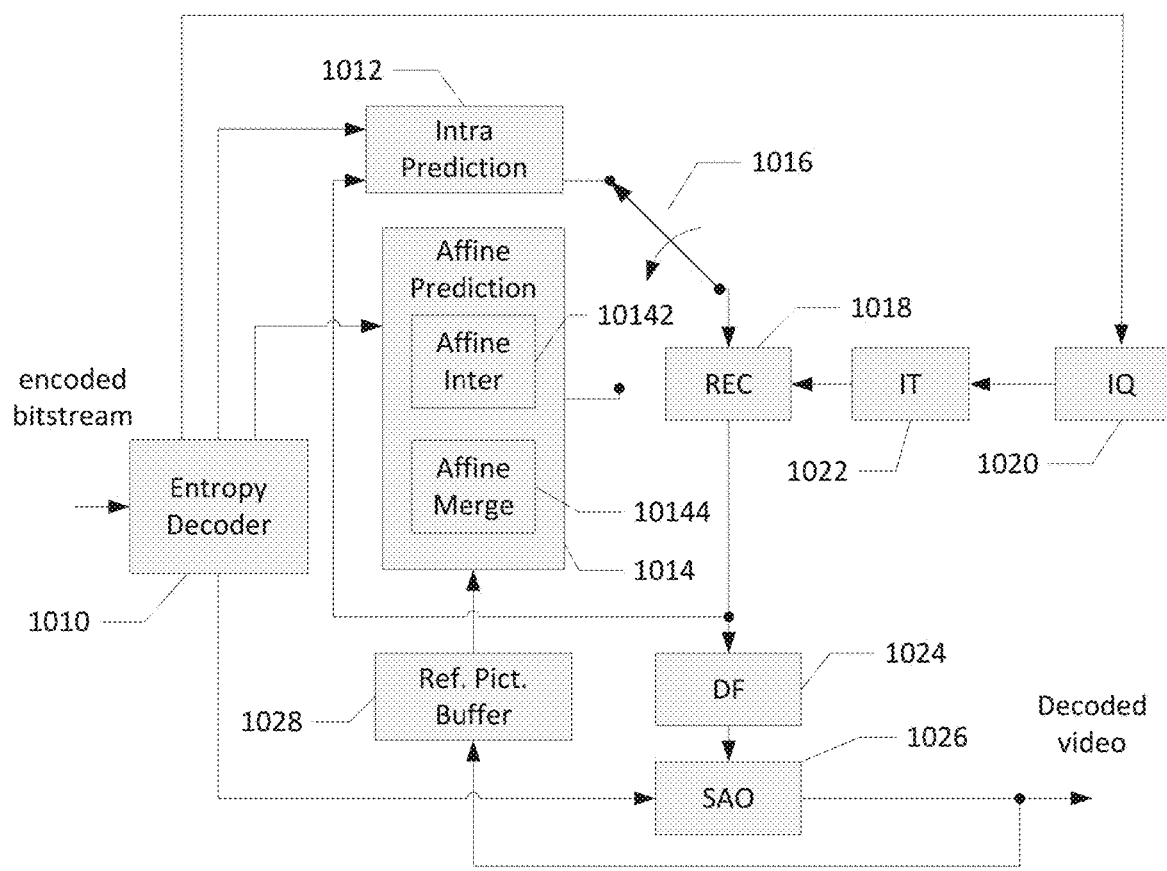
FIG. 10 illustrates an exemplary system block diagram for a video decoder implementing affine motion compensation according to various embodiments of the present invention.

A corresponding Video Decoder 1000 for the Video Encoder 900 of FIG. 9 is shown in FIG. 10. The encoded video bitstream is the input to the Video Decoder 1000 and is decoded by Entropy Decoder 1010 to recover the transformed and quantized residual signal, DF and SAO information, and other system information. The decoding process of Decoder 1000 is similar to the reconstruction loop at the Encoder 900, except Decoder 1000 only requires Motion Compensation (MC) 1014 in Affine Prediction 1014. Affine Prediction 1014 includes Affine Inter Prediction 10142 and Affine Merge Prediction 10144. Blocks coded in affine Inter mode is decoded by Affine Inter Prediction 10142 and blocks coded in affine Merge mode is decoded by Affine Merge Prediction 10144. A final affine candidate is selected for a block coded in affine Inter mode or affine Merge mode, and one or more compensated blocks are derived according to the final affine candidate. The final affine candidate may be derived according to one of the embodiments of the present invention with a temporal MV buffer storing selective MVs less than all MVs of coded blocks in the current picture. Switch 1016 selects intra predictor from Intra Prediction 10512 or affine predictor from Affine Prediction 1014 according to decoded mode information. The transformed and quantized residual signal is recovered by Inverse Quantization (IQ) 1020 and Inverse Transformation (IT) 1022. The recovered transformed and quantized residual signal is reconstructed by adding back the predictor in REC 1018 to produce reconstructed video. The reconstructed video is further processed by DF 1024 and SAO 1026 to generate final decoded video. If the currently decoded picture is a reference picture, the reconstructed video of the currently decoded picture is also stored in Ref. Pict. Buffer 1028. The temporal MV buffer storing motion vectors for affine candidate derivation may be implemented in Ref. Pict. Buffer 1028 or any other memory coupling to Affine Prediction 1014.

Various components of the Video Encoder 900 and the Video Decoder 1000 in FIG. 9 and FIG. 10 and various video coding process described in the described embodiments may be implemented by hardware components, one or more processors configured to execute program instructions stored in a memory, or a combination of hardware and processor. For example, a processor executes program instructions to control receiving of input data associated with a current block. The processor is equipped with a single or multiple processing cores. In some examples, the processor executes program instructions to perform functions in some components in the Encoder 900 and the Decoder 1000, and the memory electrically coupled with the processor is used to store the program instructions, information corresponding to the affine modes, reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 9 and 10, the Encoder 900 and the Decoder 1000 may be implemented in the same electronic device, so various functional components of the Encoder 900 and Decoder 1000 may be shared or reused if implemented in the same electronic device. For example, one or more of Reconstruction 926, Transformation 918, Quantization 920, Deblocking Filter 928, Sample Adaptive Offset 930, and Reference Picture Buffer 932 in FIG. 9 may also be used to function as Reconstruction 1018, Transformation 1022, Quantization 1020, Deblocking Filter 1024, Sample Adaptive Offset 1026, and Reference Picture Buffer 1028 in FIG.

10, respectively. In some example, a portion of Intra Prediction 910 and Affine Prediction 912 in FIG. 9 may share or reused a portion of Intra Prediction 1012 and Affine Prediction 1014 in FIG. 10.

Although the first embodiment to the ninth embodiment of video coding method with affine motion compensation are described, the invention is not limited to these embodiments. In each embodiment, the choice of the video coding method with affine motion compensation is an example to illustrate various embodiments and should not be understood as a restriction or a requirement for any embodiment of the invention. The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding with affine motion compensation in a video coding system, comprising:
   receiving input data associated with a current block in a current picture at a video encoder or receiving a video bitstream corresponding to compressed data including the current block in the current picture at a video decoder, wherein the current block is coded or to be coded in an affine mode according to an affine motion model;
   retrieving two or more motion vectors from an identical valid neighboring block from a temporal buffer for the current block, wherein the temporal buffer stores motion vectors of one neighboring N×N block row or one neighboring N×N block column of the current block, and N×N is a block size for storing one motion vector in the temporal buffer;
   deriving an affine candidate including affine motion vectors using the retrieved two or more motion vectors of the identical valid neighboring block; and
   encoding or decoding the current block by predicting the current block using one or more motion compensated blocks by the derived affine candidate, wherein the affine motion vectors predict a movement between a point of the current block and a corresponding point of the one or more motion compensated blocks.

2. The method of claim 1, wherein the retrieved two or more motion vectors correspond to two motion vectors, one of said two motion vectors is an original motion vector at an lower-left corner of the valid neighboring block and the other one of said two motion vectors is an original motion vector at an lower-right corner of the valid neighboring block if the valid neighboring block is above the current block.

3. The method of claim 1, wherein the current block is predicted by said one or more motion compensated blocks by the affine motion vectors in the affine candidate according to a four-parameter affine motion model with two control points.

4. The method of claim 1, wherein the retrieved two or more motion vectors correspond to two motion vectors, one of said two motion vectors is an original motion vector at an upper-right corner of the valid neighboring block and the other one of said two motion vectors is an original motion vector at an lower-right corner of the valid neighboring block if the valid neighboring block is on the left side of the current block.

5. An apparatus of video coding with affine motion compensation in a video coding system, the apparatus comprising one or more electronic circuits configured for:
   receiving input data associated with a current block in a current picture at a video encoder or receiving a video bitstream corresponding to compressed data including the current block in the current picture at a video decoder, wherein the current block is coded or to be coded in an affine mode according to an affine motion model;
   retrieving two or more motion vectors from an identical valid neighboring block from a temporal buffer for the current block, wherein the temporal buffer stores motion vectors of one neighboring N×N block row or one neighboring N×N block column of the current block, and N×N is a block size for storing one motion vector in the temporal buffer;
   deriving an affine candidate including affine motion vectors using the retrieved two or more motion vectors of the identical valid neighboring block; and
   encoding or decoding the current block by predicting the current block using one or more motion compensated blocks by the derived affine candidate, wherein the affine motion vectors predict a movement between a point of the current block and a corresponding point of the one or more motion compensated blocks.

* * * * *